Feb. 17, 1970   S. G. MÖRNE   3,495,877
WHEEL BALANCE WEIGHTS
Filed Feb. 1, 1968

INVENTOR
SUNE GUNNAR MÖRNE

United States Patent Office 3,495,877
Patented Feb. 17, 1970

---

3,495,877
WHEEL BALANCE WEIGHTS
Sune Gunnar Mörne, Asmundtorp, Sweden, assignor to Paul Bergsoe & Son AB, Gasverksgatan, Landskrona, Sweden
Filed Feb. 1, 1968, Ser. No. 702,282
Claims priority, application Sweden, Feb. 7, 1967, 1,695/67
Int. Cl. B60b *13/00*
U.S. Cl. 301—5       1 Claim

ABSTRACT OF THE DISCLOSURE

A balance weight for wheels, particularly automobile wheels, comprising a body of heavy material and a resilient clip partly embedded in said body and defining together with said body a space which permits mounting the balance weight on the rim of the wheel to be balanced under resilient gripping action of the spring clip, said body having projections extending into the space defined by the clip and the body whereby one and the same balance weight can be used for many different wheel types.

---

This invention relates to a balance weight for wheels, particularly automobile wheels, comprising a body of heavy material, such as lead or lead alloy, and a resilient clip of steel or like material partly embedded in said body and extending with part of the length by which it projects from the body, along and being spaced a distance from a surface of the body to define a space which permits mounting the balance weight on the rim of the wheel to be balanced under resilient gripping action of the spring clip.

For static and dynamic balancing of wheels use is made of weights of the above mentioned type which are secured with the aid of the spring clip to a projecting flange of the wheel rim. The balance weights now available in the market are disadvantageous in that a very great number of such weights having different clips must be kept in store, for different clips have to be used for various wheel types of passenger cars while other clips have to be used for truck and bus wheels. Considering that so large an assortment must be available in each weight class it is evident that a supply of weights for balancing all vehicle wheels on the market will be extremely extensive; at least small repair shops will not have the possibility of keeping weights in store other than those required for the most customary types of automobile wheels.

The present invention has for its object to overcome this disadvantage which is inherent in previously known balance weights and to provide more universally useful weights. To this end, the surface of the body opposite the spring clip has at least one element which projects into said space.

A balance weight which is formed in this way can be used for a great many wheel types due to the increased adaptability realized with the aid of said element, especially when, in accordance with a further characteristic of the invention, the elements are of the same material and integral with the body of the balance weight, it being possible to abrade a greater or smaller portion of the element for mounting the weight on the wheel rim.

The invention will be described more in detail in the following with reference to the accomapnying drawing which illustrates two embodiments. In the drawing:

FIG. 1 is a rear view of a balance weight according to the invention;

Figure 2:
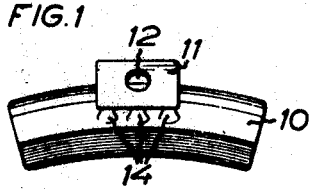
FIG. 2 is a cross section, on a larger scale, of the balance weight shown in FIG. 1.
Figure 3:
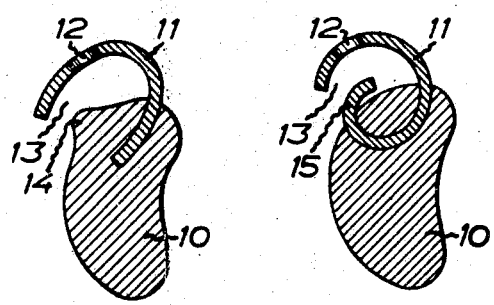
FIG. 3 is a cross section, likewise on a larger scale, of a modified balance weight.

The balance weight according to the present invention comprises a body 10 of lead alloy, such as lead and antimony. The body 10 is slightly curved in its longitudinal direction in the usual manner to conform to a wheel rim. For permitting fixation of the body 10 to the wheel rim the body has a spring clip 11 embedded therein, which comprises a bent piece of steel with a hole 12 therein. As will appear from FIGS. 2 and 3, the clip 11 extends with part of the length by which it projects from the body, substantially in parallel with and spaced a distance from the body to define a space 13 which permits mounting the balance weight on the wheel rim under resilient gripping action of the clip. To make it possible to use the balance weight for automobile wheels of many different types the body 10 has projecting studs 14 on the side facing the spring clip, said studs being integral with the body 10. Consisting of lead alloy, said studs can be abraded to a greater or lesser extent depending upon the thickness and shape of the wheel rim to which the balance weight is to be attached. Naturally, the distance between the upper end of the studs and the inner side of the spring clip is selected smaller than the thickness of the thinnest edges of the wheel rims available on the market. Substantially the same result is attained if as shown in FIG. 3 the end of the clip portion embedded in the body 10 projects from said body opposite that part of the clip which is parallel with a portion of the body, and if said end is bent at an angle. Of course this end is not to be abraded but instead exerts a spring movement inwardly against the body.

It is readily realized that the clip parts projecting from the body opposite the spring clip can be designed in many different ways to fulfill their purposes, and it may be mentioned that a ridge extending longitudinally of the body 10 has proved extremely advantageous in practical use. Therefore the invention should not be considered limited to the embodiments described above and shown in the drawing, but can be modified in various ways within the scope of the appended claims.

What I claim and desire to secure by Letters Patent is:

1. A balance weight for balancing automobile wheels comprising a body of heavy metallic material, a resilient clip partly embedded in the body and having a part projecting from said body, said clip part extending along and being spaced a distance from a surface of the body to define a space to permit mounting the balance weight on a rim of the wheel to be balanced under resilient gripping action of the resilient clip, said body having a plurality of individual studs projecting integrally therefrom on the surface of the body opposite the spring clip with studs projecting into said space to be engageable with a wheel rim, said body being made of abradable material so as to permit the projections to be abraded to fit the rim of the wheel.

References Cited

UNITED STATES PATENTS

| 2,258,011 | 10/1941 | Inman | 301—5 |
| 2,576,724 | 11/1951 | Powell | 301—5 |

FOREIGN PATENTS

| 1,118,399 | 3/1956 | France. |
| 1,097,394 | 1/1968 | Great Britain. |

RICHARD J. JOHNSON, Primary Examiner